(12) United States Patent
Bao et al.

(10) Patent No.: US 9,992,198 B2
(45) Date of Patent: Jun. 5, 2018

(54) NETWORK-BASED FRICTIONLESS TWO-FACTOR AUTHENTICATION SERVICE

(71) Applicant: Verizon Patent and Licensing Inc., Arlington, VA (US)

(72) Inventors: Guanqun Bao, Sunnyvale, CA (US); Gaurav Gupta, Fremont, CA (US); Raymond C. Counterman, Canton, MA (US); Jae Won Chung, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 106 days.

(21) Appl. No.: 14/970,180

(22) Filed: Dec. 15, 2015

(65) Prior Publication Data
US 2017/0171199 A1 Jun. 15, 2017

(51) Int. Cl.
*H04L 29/06* (2006.01)
(52) U.S. Cl.
CPC ........ *H04L 63/0884* (2013.01); *H04L 63/083* (2013.01); *H04L 63/0876* (2013.01); *H04L 63/123* (2013.01)
(58) Field of Classification Search
USPC .......................................................... 726/7
See application file for complete search history.

(56) References Cited

U.S. PATENT DOCUMENTS

| | | | | |
|---|---|---|---|---|
| 7,945,034 B2* | 5/2011 | Gonen | ..................... | H04L 63/08 370/354 |
| 2012/0210119 A1* | 8/2012 | Baxter | .............. | G06F 17/30861 713/150 |
| 2012/0276868 A1* | 11/2012 | Martell | ............... | H04L 12/1453 455/406 |
| 2014/0157381 A1* | 6/2014 | Disraeli | .................. | G06F 21/31 726/7 |
| 2017/0026187 A1* | 1/2017 | Ramatchandirane | . | H04L 9/3268 |
| 2017/0026339 A1* | 1/2017 | Degenkolb | ........... | H04L 63/029 |
| 2017/0302642 A1* | 10/2017 | Hindocha | ............... | H04L 63/08 |

OTHER PUBLICATIONS

D. Hardt, "The OAuth 2.0 Authorization Framework," Internet Engineering Task Force (IETF) Request for Comments 6749, Oct. 2012 (available at https://datatracker.ietf.org/doc/rfc6749/).
N. Sakimura et al., "OpenID Connect Core 1.0 incorporating errata set 1," Nov. 2014 (available at http://openid.net/specs/openid-connect-core-1_0.html).

* cited by examiner

*Primary Examiner* — Jason Lee

(57) ABSTRACT

Techniques described herein may be used to enable users to access services protected by two-factor security systems without having to provide additional authentication information (e.g., a portion of the user's social security number, biometric information, etc.). An application server may provide one or more services, such as a social networking service, an online banking service, etc. When a user device attempts to access the service, the user may provide a username and password, to the application server, as the first factor of a two-factor authentication process required to access the service. However, instead of requiring the user to provide additional authentication information (e.g., the second factor), a network authentication server, the application server, and the user device may collaborate to automatically provide the additional authentication information.

20 Claims, 10 Drawing Sheets

NETWORK-BASED FRICTIONLESS TWO-FACTOR AUTHENTICATION SERVICE

BACKGROUND

The Internet has made a wide variety of services readily available to users. Examples of such services may include social networking services, banking services, communication services (e.g., email, instant messaging and video calls), etc. However, a pervasive concern of providing such services is maintaining a level of security intended to prevent individuals from accessing such services unlawfully. As such, users must often be authenticated before accessing online services. In some scenarios, the user may only be required to provide a username and password in order to access certain services.

However, current security trends, intended to increase security, may require additional authentication information from the user. Examples of such information may include a portion of a user's social security number (e.g., the last four digits) or biometric information of the user (e.g., fingerprints, a retina scan, a voice input, etc.). Such an authentication system is sometimes referred to as two-factor authentication, where the username and password are one factor and the additional authentication information is the other factor. While two-factor authentication services may increase the security of a network or service, requiring the user to provide additional authentication information may increase the time and effort required to access a service.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein may be used to enable users to access services protected by two-factor security systems without having to provide additional authentication information (e.g., portions of the user's social security number, biometric information, etc.). For example, a network service provider may maintain a network (e.g., the wireless telecommunications network) that includes a repository of user information associated with users permitted to access the network. When a user device (e.g., a smartphone, laptop computer, etc.) accesses the network, the network may assign an Internet Protocol (IP) address to the user device and store a record of the IP address and an identifier (e.g., a mobile device number (MDN)) of the user device.

Additionally, when the user device attempts to access a particular service, such as a social networking service or a banking service, the user may provide a username and password required to access the service. The username and password may function as a first factor in a two-factor authentication process required to access the service. However, instead of requiring the user to provide additional authentication information (e.g., the second factor), the network service provider, the organization providing the service sought by the user, and the user device may collaborate to automatically provide the additional authentication information using the user information stored by the network service provider. As described below, this may be facilitated by the fact that the network service provider knows the IP address assigned to the user device (via the association of the IP address with the MDN of the user device), such that the user information corresponding to a particular user may essentially be identified and accessed based on the IP address previously assigned to the user device and associated with the MDN of the user device. As such, with the techniques described herein, users may only be required to provide a username and password in order to access services protected by two-factor authentication processes.

Figure 1A:
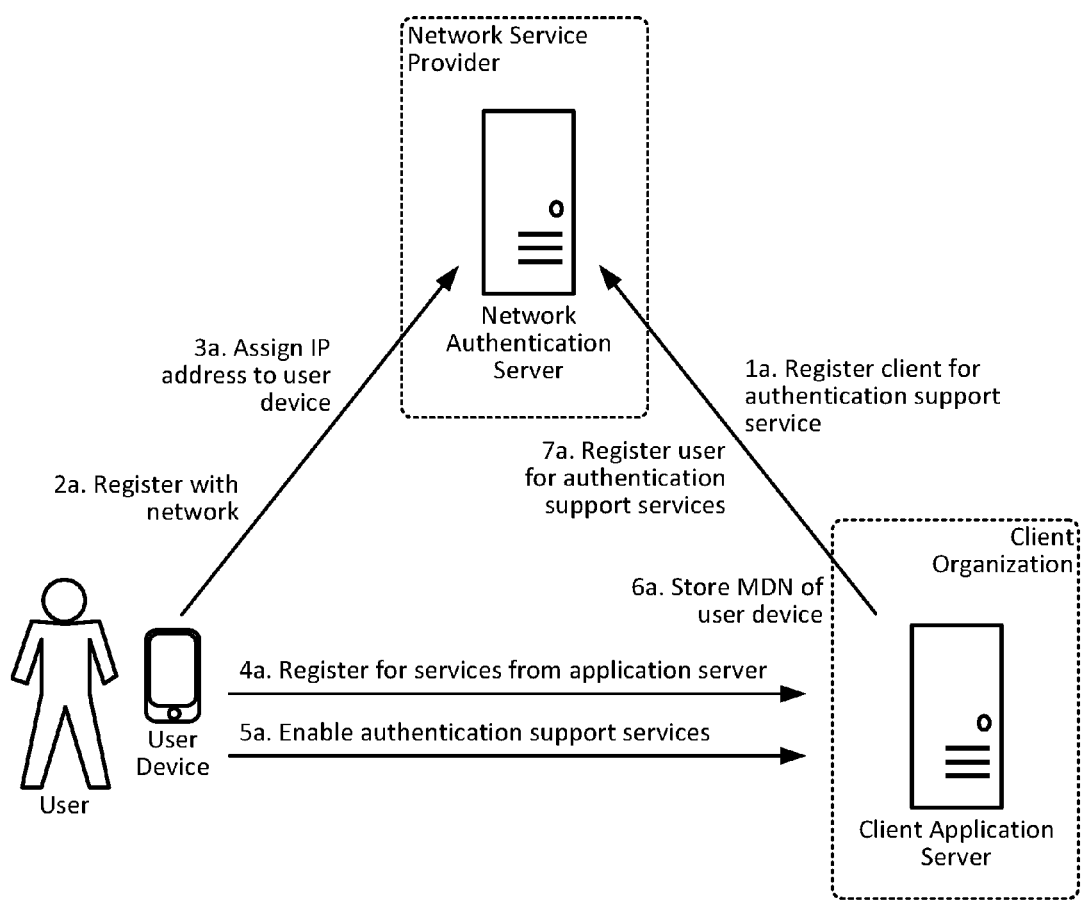
FIGS. 1A and 1B illustrate an example overview of an implementation described herein.
Figure 1B:
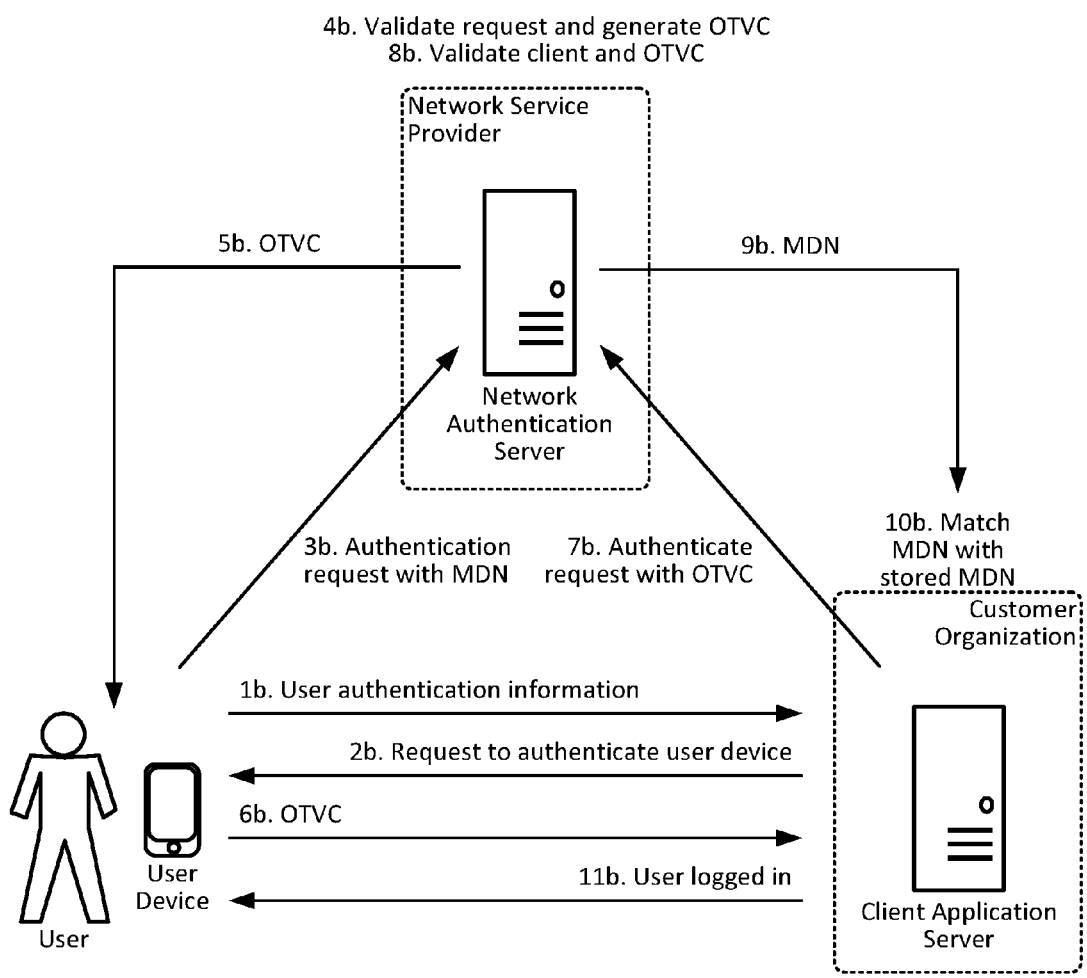

FIGS. 1A and 1B illustrate an example overview of an implementation described herein. FIG. 1A may include an example of a procedure for setting up, or registering, a user device for authentication support services regarding a two-factor authentication process, while FIG. 1B may include an example of a two-factor authentication procedure using authentication support services. Referring to FIG. 1A, an organization, such as a network service provider, may provide wired and/or wireless network services to customers (or clients), which may include individual users and organizations (e.g., businesses, academic institutions, government agencies, etc.). Examples of such services may include access to a wireless telecommunications network, access to a wired network (such as the Internet), data storage services, data security services, access to multimedia content, etc. In some implementations, clients of the network service provider may offer services of their own. For instance, a client of the network service provider may operate one or more application servers capable of providing users with a social networking service, an online banking service, a search engine service, etc.

In some implementations, in order to access the services, a user must first register for the service (e.g., create a user account). Once the user is registered for the service, the user may typically be required to complete a two-factor authentication process each time the user wants to access the service. As explained above, the two-factor authentication process may require a username and password to satisfy one factor of the authentication process and then another type of authentication information (e.g., a portion of the user's social security number, the maiden name of the user's mother, an appropriate MDN, etc.) to satisfy the second factor of the authentication process. In order to simplify the authentication process (from the perspective of the user) without having to forgo the security benefits of a two-factor authentication process, a client organization may register for an authentication support service that is provided by a network authentication server of the network service provider (at 1*a*). As described below, this may give users the option of whether to simplify the two-factor authentication process by permitting the network service provider to automatically provide some of the authentication information required by the two-factor authentication process.

In order to access the services provided by the client organization, a user may first register a user device (e.g., a smartphone, a tablet computer, etc.) with a network (e.g., a wireless telecommunications network) of the network service provider (at 2*a*). This may include communicating with one or more server devices of the network, which may include the network authentication server depicted in FIG. 1A. In doing so, the network may assign an Intent Protocol (IP) address to the user device (at 3*a*). Additionally, the network service provider may create a record of the IP address assigned to the user device so that the user device may be identified by the IP address (in addition to the MDN) of the user device.

The IP address may enable the user device to contact the client application server in order to register for the service offered by the client organization (at 4*a*). In some implementations, the client application server may receive (and store) the MDN of the user device when the user device is registered for the service offered by the client application server. During, or subsequent to, the user device registering for the service (at 4*a*), the user device may enable authentication support services offered by the network service provider (at 5*a*). As described above, the authentication support services may enable the user to complete the two-factor authentication process without having to provide information for the second factor of the two-factor authentication process. For instance, the client may only be required to enter information for one of the authentication factors (e.g., a username and password), and any additional information that is required for authentication (e.g., information for the second factor) may be provided by the network authentication server.

In response to the user device requesting that the authentication support services be enabled, the client application server may store information that identifies the user device (e.g., the MDN of the user device) (at 6*a*) and may communicate with the network authentication server to register the user device for the authentication support services (at 7*a*). As such, the user device, network authentication server, and application server may perform a series of setup or registration operations that may enable the network service provider to facilitate the two-factor authentication processes required by the client organization before the user device may access the application server.

As mentioned above, FIG. 1B may include an example of a two-factor authentication procedure using authentication support services. In order to gain access to services provided by the application server, the user device may access a webpage that prompts the user for authentication information (e.g., a username and password) that may correspond to the first factor of the two-factor authentication service (at 1*b*). In response to the user providing valid authentication information, the application server may send an authentication request to the user device (at 2*b*), which the user device may automatically forward or relay to the network authentication server (at 3*b*). The request may include identification information corresponding to the client application server. The request may include the IP address assigned to the user device, and as the request is relayed through the network to the network authentication server, the network may identify the MDN of the user device based on the IP address in the request, and insert the MDN into the request. The network authentication server may validate the request (based on the identification information corresponding to the client application information) and generate a one-time validation code (OTVC) using the MDN (at 4*b*). The network authentication server may send the OTVC to the user device (at 5*b*).

The user device may automatically forward the OTVC to the application server (at 6*b*), and the application server may respond by sending an authentication request (along with the OTVC) to the network authentication server (at 7*b*). Based on the information in the request, the network authentication server may validate the client organization and the OTVC (at 8*b*) and may send a copy of the MDN of the user device to the application server (at 9*b*). The copy of the MDN may correspond to the second factor of the two-factor authentication required by the application server. As such, the application server may compare the copy of the MDN with an MDN that the application server received from the user device previously (e.g., during the initial registration of the user device) (at 10*b*).

In some implementations, the network authentication server may communicate one or more types of user information (along with the MDN) to enable the application server to compare the MDN from the network authentication server with the appropriate MDN stored by the application server. For instance, the network authentication server may communicate a username associated with the MDN to the application server, and the application server may identify a stored MDN based on the username. The MDN received from the network authentication server may then be validated by comparing the received MDN with the MDN, stored by the application server, associated with the username. In some implementations, an IP address and port number used to send the request to authenticate the OTVC may be associated with user information (e.g., a username, an MDN, etc.), and network authentication server may use the IP address and port number to send the MDN to the client application server. In such implementations, the client application server may use the IP address and port number to identify the appropriate MDN to compare with the MDN received from the network authentication server.

When the MDNs match one another, the two-factor authentication requirement may be satisfied, and the application server may notify the user that he or she has been logged in and may access the requested service (at 11*b*). As such, techniques described herein may enable a user to complete a two-factor authentication requirement by providing authentication information corresponding to only one of the required factors. As described below, in some implementations, one or more encryption techniques may also be used to further ensure the security of the authentication support service enabled by the network authentication server.

Figure 2:
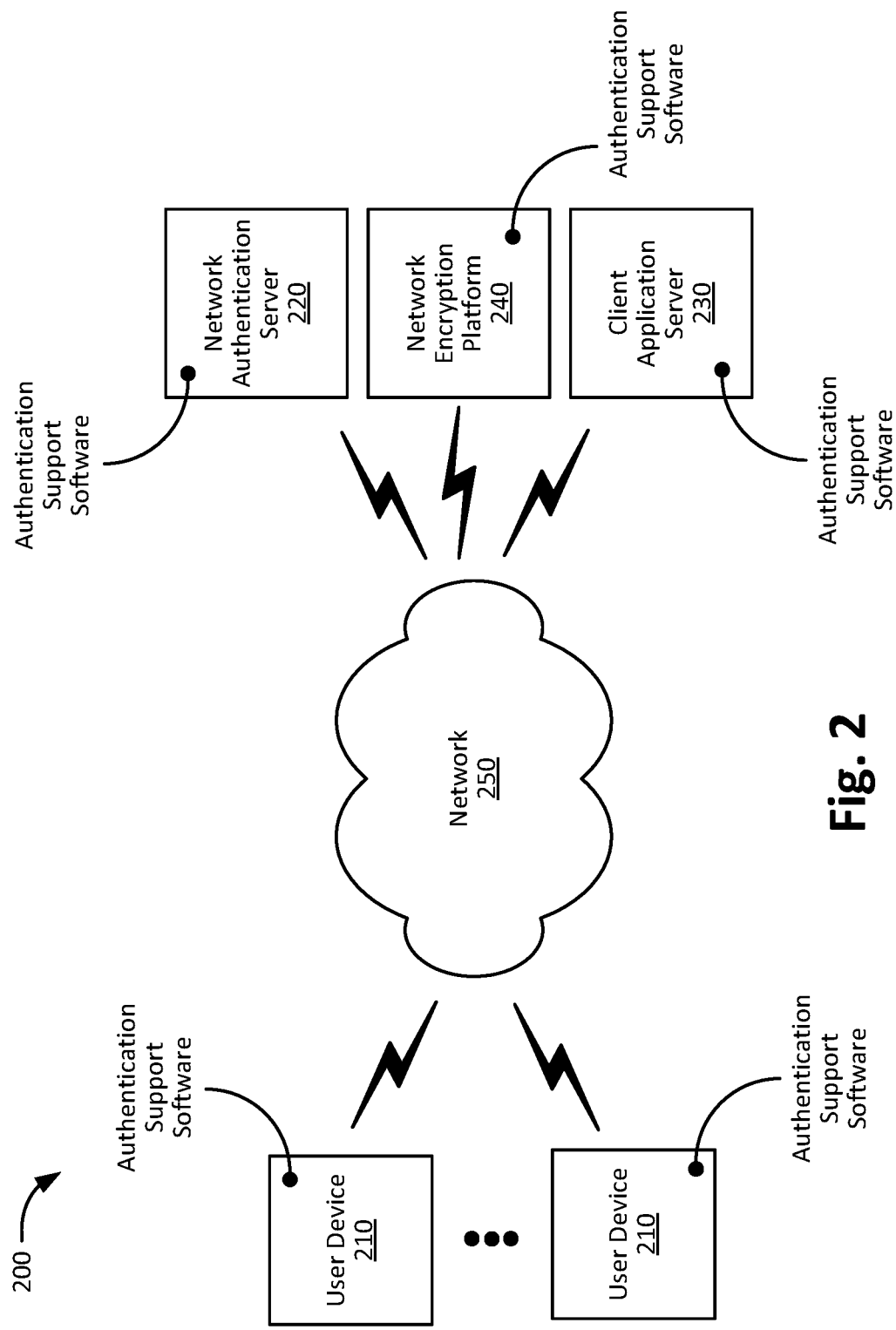
FIG. 2 is a diagram of an example environment in which systems and/or methods described herein may be implemented.

FIG. 2 is a diagram of an example environment 200 in which systems and/or methods described herein may be implemented. Environment 200 may include one or more user devices 210, network authentication server 220, client application server 230, network encryption device 240, and network 250.

User device 210 may include a portable computing and communication device, such as a personal digital assistant (PDA), a smart phone, a cellular phone, a laptop computer with connectivity to a cellular wireless network, a tablet computer, etc. User device 210 may also include non-portable computing devices, such as a desktop computer, a consumer or business appliance, or other devices that have the ability to connect to network 250. User device 210 may also include a computing and communication device that may be worn by a user (also referred to as wearable devices) as a watch, a fitness band, a necklace, glasses, an eyeglass, a ring, a belt, a headset, or another type of wearable device.

As depicted, user device 210 may include software, such as a user device version of authentication support software, that may enable user device 210 to perform one or more of the operations described herein, such as forwarding requests and information between network authentication server 220 and client application server 230. In some implementations, user device 210 may be capable of performing such operations without specialized software. For instance, an authentication request that is received from application server 230 but intended for network authentication server 220 may include a message (e.g., a Hypertext Markup Language (HTML) 302 Redirect message) that user device 210 is already capable of receiving, understanding, and heeding.

Network authentication server 220 may include one or more computing devices, such as a server device or a collection of server devices, capable of facilitating a two-factor authentication requirement by, for example, providing at least some of the required authentication information. In some implementations, network authentication server 220 may be owned and/or operated by a network service provider (e.g., an organization that operates a wireless telecommunications network, an Intent Service Provider (ISP) network, etc.). Additionally, network authentication server 220 may include, or otherwise have access to, one or more types of user information (e.g., user identification and/or authentication information) for users registered with the network service provider. Examples of such information may include user names, user street addresses, user device MDNs, IP addresses assigned to registered user devices, etc.

As depicted, network authentication server 220 may include software, such a network server version of authentication support software, which may enable network authentication server 220 to perform one or more of the operations described herein. For instance, the authentication support software may enable client application server 230 to register user device 210 for authentication support services, to encrypt and decrypt information for enhanced security, to generate and store certain types of authentication information, to communicate with user device 210 and client application server 230 at different times and in different ways, etc.

Client application server 230 may include one or more computing devices, such as a server device or a collection of server devices, capable of providing one or more services (e.g., a social networking service, a banking service, etc.) to user device 210, implementing a two-factor authentication service for accessing such services, registering user device 210 for such services, registering user device for authentication support services, etc. In some implementations, client application server 230 may be owned and/or operated by an organization (e.g., an academic institution, a research institution, a business, a government agency, etc.) other than the network service provider. Additionally, client application server 220 may include software, such application server version of authentication support software, which may enable network authentication server 220 to perform one or more of the operations described herein. For instance, the authentication support software may enable client application server 230 to enable the user to specify whether he or she would like to have authentication support services enabled, to send an authentication request to user device 210, to send a request to network authentication server 220 to verify certain information, and to determine whether authentication information (whether from user device 210 and/or network authentication server 220) is valid, etc.

Network encryption platform 240 may include one or more switches, routers, servers, and/or other network devices capable of relaying information from user device 210 to network authentication server 220 and of implementing one or more network security policies. Network encryption platform 240 may include software, such a version of authentication support software, which may enable network authentication server 220 to perform one or more of the operations described herein. For instance, the authentication support software may enable network encryption platform 240 to receive an authentication request from user device 210, determine the MDN of user device 210, encrypt the MDN, and insert the encrypted MDN into a header of the request before sending the request to network authentication server.

In some implementations, the authentication support service for a relative large network may be implemented by a single server device or a centralized group of server devices. In such implementations, network encryption platform 240 may be implemented by network devices throughout the network (e.g., at Radio Access Network (RANs) throughout the network) so that when an authentication request is received from user device 210, the MDN of the user device may be promptly identified, encrypted, and inserted into the request, before the authenticating request is forwarded on to a remotely located network authentication server 220. Doing so may increase security by ensuring that the MDN remains obfuscated (to unauthorized or malicious devices) as it pass through the network to network authentication server 220.

Network 250 may include one or more wired and/or wireless networks. For example, network 250 may include a cellular network (e.g., a second generation (2G) network, a third generation (3G) network, a fourth generation (4G) network, a fifth generation (5G) network, a LTE network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Figure 3:
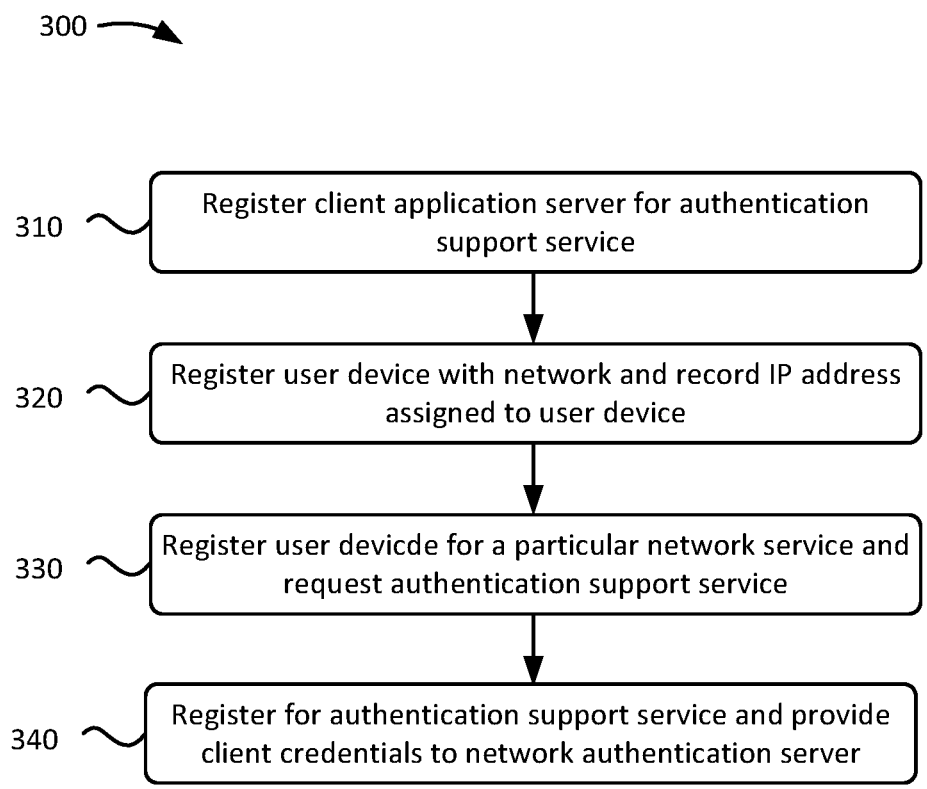
FIG. 3 is a flowchart diagram of an example process for setting up a two-factor authentication service.

FIG. 3 is a flowchart diagram of an example process 300 for setting up a two-factor authentication service. In some implementations, process 300 may be implemented by one or more of user device 210, network authentication server 220, and/or client application server 230.

As shown, process 300 may include registering client application server 230 for authentication support service (block 310). For instance, client application server 230 may communicate with network authentication server 220 (and/or another device of the network service provider) to register for authentication support services that may be provided by network authentication server 230. In some implementations, this may include completing an application that requires various types of information, such as information identifying the client (e.g., a client identifier (ID)), information identifying client application server 230, and security information (e.g., encryption keys) for communicating with client application server 230. Additional examples of such information may include an indication that client application server 230 implements a two-factor authentication process, information identifying the two-factor authentication process, information identifying a manner, format, and/or location (e.g., a callback URL) regarding how network authentication server should submit authentication information for the two-factor authentication process, etc.

Process 300 may include registering user device 210 with a network and recording an IP addressed assigned to user device 210 (block 320). For example, user device 210 may register with a wireless telecommunications network. In some implementations, this may include user device 210 establishing a wireless connection with a base station (e.g., an evolved Node B (eNB)) of the network and providing identification and/or authentication information to one or more core network devices of the wireless telecommunications network. In some implementations, user device 210 may be assigned an IP address by registering with the network, which user device 210 may use to communicate with one or more IP-based networks (such as a 4G network, the Internet, etc.).

In some implementations, a record of the IP address assigned to user device 210 may be created, such that network authentication server 220, network encryption platform 240, or another network device may readily identify user device 210 based on the IP address. For instance, the IP address may be associated with an MDN of user device 210. As such, network authentication server 220, network encryption platform 240, or another network device may determine the MDN of user device 210 based on data packets that user device 210 may use to communicate over an IP-based network.

Process 300 may include registering a user device for a particular network service and requesting that an authentication support service be enabled (block 330). For example, user device 210 may communicate with an application server (e.g., client application server 230) capable of providing a particular service via a wireless telecommunications network, the Internet, or another type of network. As noted above, examples of such services may include a social networking service, an email service, an instant messaging service, a banking service, a financial transactions service, an online auction service, an online retail service, an information forum, a search engine, a database, a legal service (e.g., a service that enables user to submit legal documents to court or other government entity), etc. In some scenarios, client application server 230 may require a user of the user device to create an account before being permitted to access the service. As such, user device 210 may provide client application server 230 with various types of user information, such as a name of the user, a username, a password, an email address, a MDN of user device 210, etc.

Additionally, the client application server 230 may enable the user to specify one or more settings that may customize the service (or the manner in which the service is provided) for the user. For instance, a search engine service may enable the user to specify what types of information (e.g., text, images, videos, document types, etc.) that the user would like to receive a search result, the number of results displayed per webpage, categories or databases of information that the user would like to have searched, etc. In some implementations, the user may be capable of specifying whether he or she would like to simplify the process of logging into the service by enabling the authentication support service described herein.

Process 300 may also include registering for the authentication support service and providing client credentials to network authentication server 220 (block 340). For example, in response to receiving an indication that the user wants the authentication support service, client application server 230 may register user device 210, for the authentication support service, with network authentication server 220. In some implementations, this may include informing network authentication server 220 that user device 210 has requested and authorized network authentication server 220 to assist with logging in user device 210 via the two-factor authentication service required by client application server 230. In some implementations, registering for the authentication support service may also include client application server 230 providing one or more types of information identifying user device 210. As described above, an example of such information may include the MDN of user device 210. In some implementations, client application server 230 may store a copy of the user device identification information provided to network authentication server so that, when authentication information regarding the registered user device 210 is later received from network authentication server 220, client application server 220 may validate the authentication information by comparing the copy of the information received with the copy of the information stored by client application server 230 at the time user device 210 was initially registered for the authentication support service.

Figure 4:
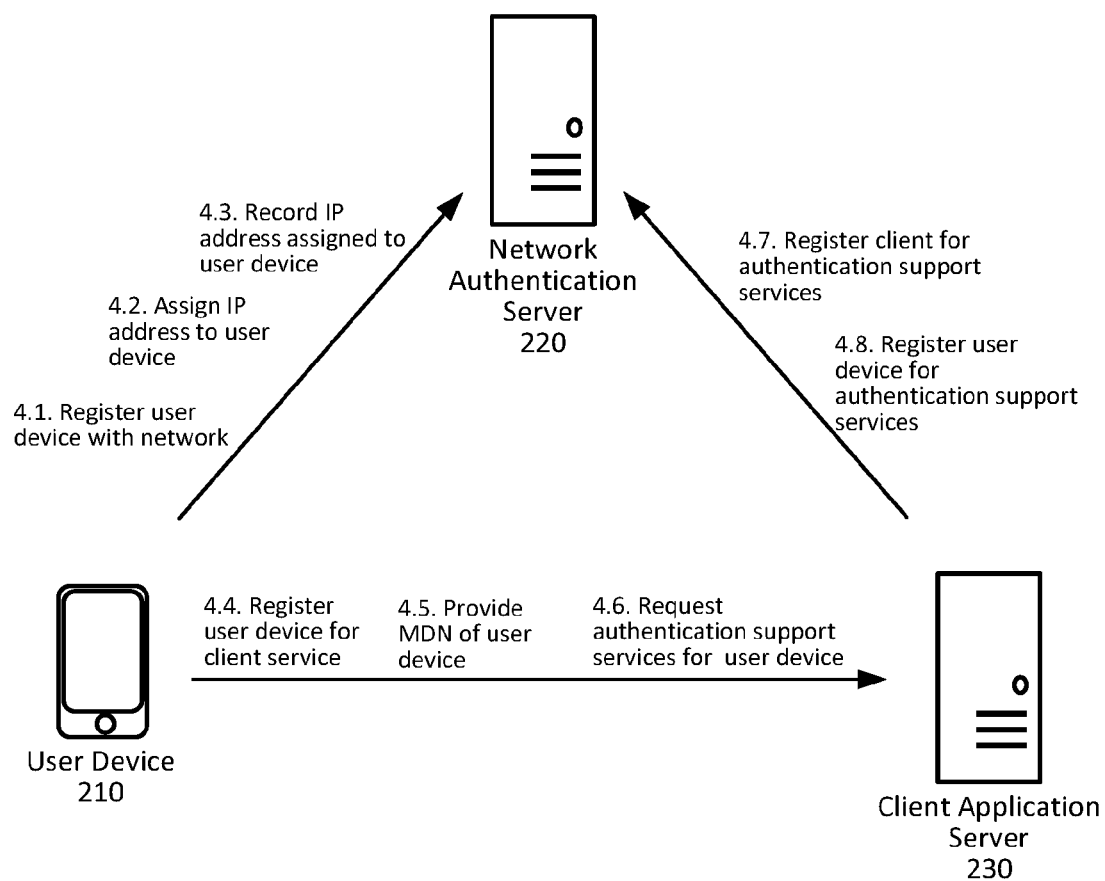
FIG. 4 is a data flow diagram of an example for enabling an authentication support service.

FIG. 4 is a data flow diagram of an example for enabling an authentication support service. As shown, FIG. 4 includes user device 210, network authentication server 220, and client application server 230. FIG. 4 also includes examples of operations (4.1-4.8) that may be performed in order to enable the authentication support service. In some implementations, an example for enabling an authentication support services may include fewer operations or devices, additional operations or devices, and/or alternative operations or devices than those depicted in FIG. 4.

As shown, user device 210 may register with a network (such as network 250) (at 4.1). User device 210 may be assigned an IP address that may be recorded by the network (e.g., by network authentication server 220) (at 4.2). Network authentication server 220 (and/or another device of the network) may record the IP address assigned to user device 210 (at 4.3). User device 210 may register for a service offered by client application server 230 (at 4.4). As part of the registration process, user device 210 may provide the MDN of user device 210 to client application server 230 (at 4.5). Additionally, user device 210 may enable authentication support services for accessing the services offered by client application server 230 (at 4.6).

In response to authentication support services being enabled, client application server 230 may register for authentication support services offered by network authentication server 220 (at 4.7). Client application server 230 may also provide network authentication server 220 with credentials, such as a client ID and a callback URL. The callback URL may correspond to a two-factor authentication process required by client application server 230 in order for user device to gain access to the services offered by client application server 230. Client application server 230 may also register user device 210 for authentication support services (at 4.7).

Figure 5:
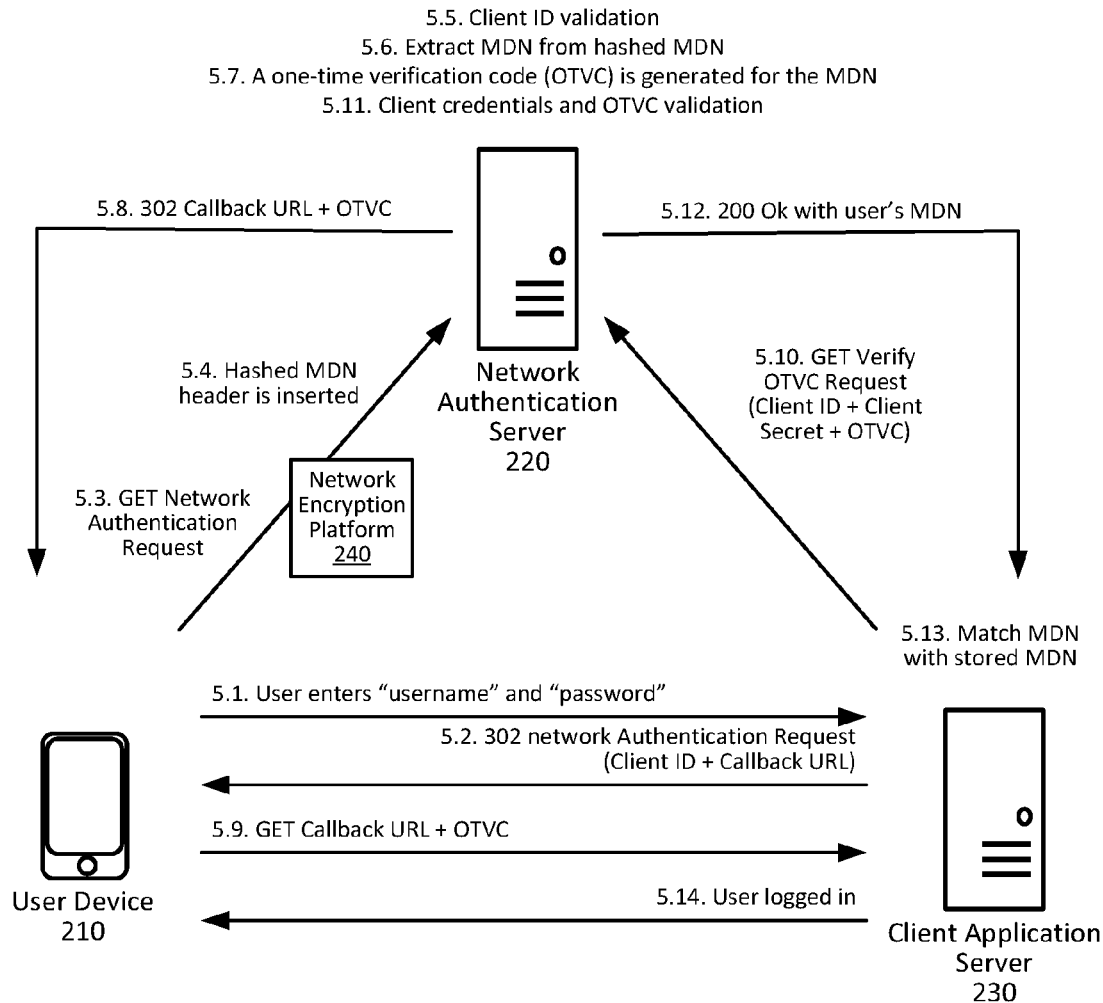
FIG. 5 is a data flow diagram of an example for providing authentication support services for a two-factor authentication service.

FIG. 5 is a data flow diagram of an example for providing authentication support services for a two-factor authentication service. As shown, FIG. 5 includes user device 210, network authentication server 220, client application server 230, and network encryption platform 240. FIG. 5 also includes examples of operations (5.1-5.14) that may be performed in order to provide authentication support services for a two-factor authentication service. In some implementations, an example for providing authentication support services for a two-factor authentication service may include fewer operations or devices, additional operations or devices, and/or alternative operations or devices than those depicted in FIG. 5.

For the purposes of explaining FIG. 5, assume that user device 210 has already registered with the network (e.g., network 250), the services offered by client application server 230, and that authentication support services have been enabled for user device 210 (as described above with reference to FIG. 4). As shown, user device 210 may attempt to log in to a service offered by client application server 230 by, for example, providing a username and password to client application server 230 (at 5.1). Client application server 230 may respond by sending user device 210 a request for authentication from the network (e.g., network authentication server 220) (at 5.2).

In some implementations, the request may include a Hypertext Transfer Protocol (HTTP) 302 Redirect message. The authentication request may include the client ID of client application server 230 (or the organization operating client application server 230). The authentication request may also include a callback URL of the service that user device 210 is attempting to access (or the webpage user device 210 used to provide the username and password).

In accordance with the redirect message, user device 210 may send a request to network authentication server 220 (at 5.3). The request to the network authentication server 220 may include an HTTP Get request and may include the client ID and callback URL received from client application server 230. The request may also include the IP address of user device 210. As the request passes from user device 210 to network authentication server 220, network encryption platform may intercept the request, identify the MDN of user device 210, encrypt a copy of the MDN (e.g., using a hashing function), and insert the encrypted MDN into a header of the request (at 5.4). In some implementations, instead of the MDN being identified by network encryption platform 240, network authentication server 220 may identify the MDN based on the IP address in the request.

In response to the request from user device 210, network authentication server 220 may validate the client ID to verify that client application server 230 is registered with network authentication server 220 (at 5.5). Network authentication server 220 may also decrypt the MDN, and generate a OTVC based on the MDN and the client ID (at 5.6 and 5.7). Network authentication server 220 may also send a redirect message (e.g., an HTTP Redirect message) to user device 210 (at 5.8). The redirect message may include the callback URL and the OTVC. In response to the redirect message from network authentication server 220, user device 210 may forward the callback URL and OTVC to client application server 230 (at 5.9). In some implementations, user device 210 may do so using an HTTP Get message.

Client application server 230 may communicate a request to authenticate user device 210 to network authentication server 220 (at 5.10). The request may include the client ID of client application server 230, a password (e.g., a client secret) of client application server 230, and the OTVC. Network authentication server 220 may validate the client credentials (e.g., the client ID and the client secret) and the OTVC (at 5.11). In response to the validation, network authentication server 220 may communicate the MDN of user device 210 to client application server 230 (at 5.12). In some implementations, network authentication server 220 may use an HTTP 200 OK message to send the MDN. Client application server 230 may use the MDN from the network authentication server 220 with an MDN received from user device 210 (from when user device 210 registered with client application server 230) (at 5.13). When the MDNs match, client application server 230 may respond to user device 210 with a notification that user device 210 has been successfully logged in (at 5.14).

In some implementations, a different type of information may be used as the second factor for the two-factor authentication process. Examples of such information may include a portion of a social security number of the user (e.g., the last four digits), a maiden name of the user's mother, a name of a first pet of the user, etc. In such scenarios, network authentication server 220 may provide the appropriate authentication information to client application server 230 (e.g., at 12) after user device 210 has been adequately authenticated by network authentication server 220. In some implementations, network authentication server 220 may simply provide an indication of the user device being validated (as opposed to, for example, actual user information such as, the MDN of user device 210, the last four digits of the social security number of the user, etc.) as the second factor in the two-factor authentication process. Additionally, client application server 230 may indicate, to the network authentication server 220, the type of information that is required to complete the two-factor authentication process. In some implementations, this may be done when client application server 230 registers for the authentication support services (e.g., FIG. 4, at 1), when client application server 230 registers user device 210 for the authentication support services (e.g., FIG. 4, at 8), when client application server 230 requests that the OTVC be verified (e.g., FIG. 5, at 10), or at another time.

Figure 6:
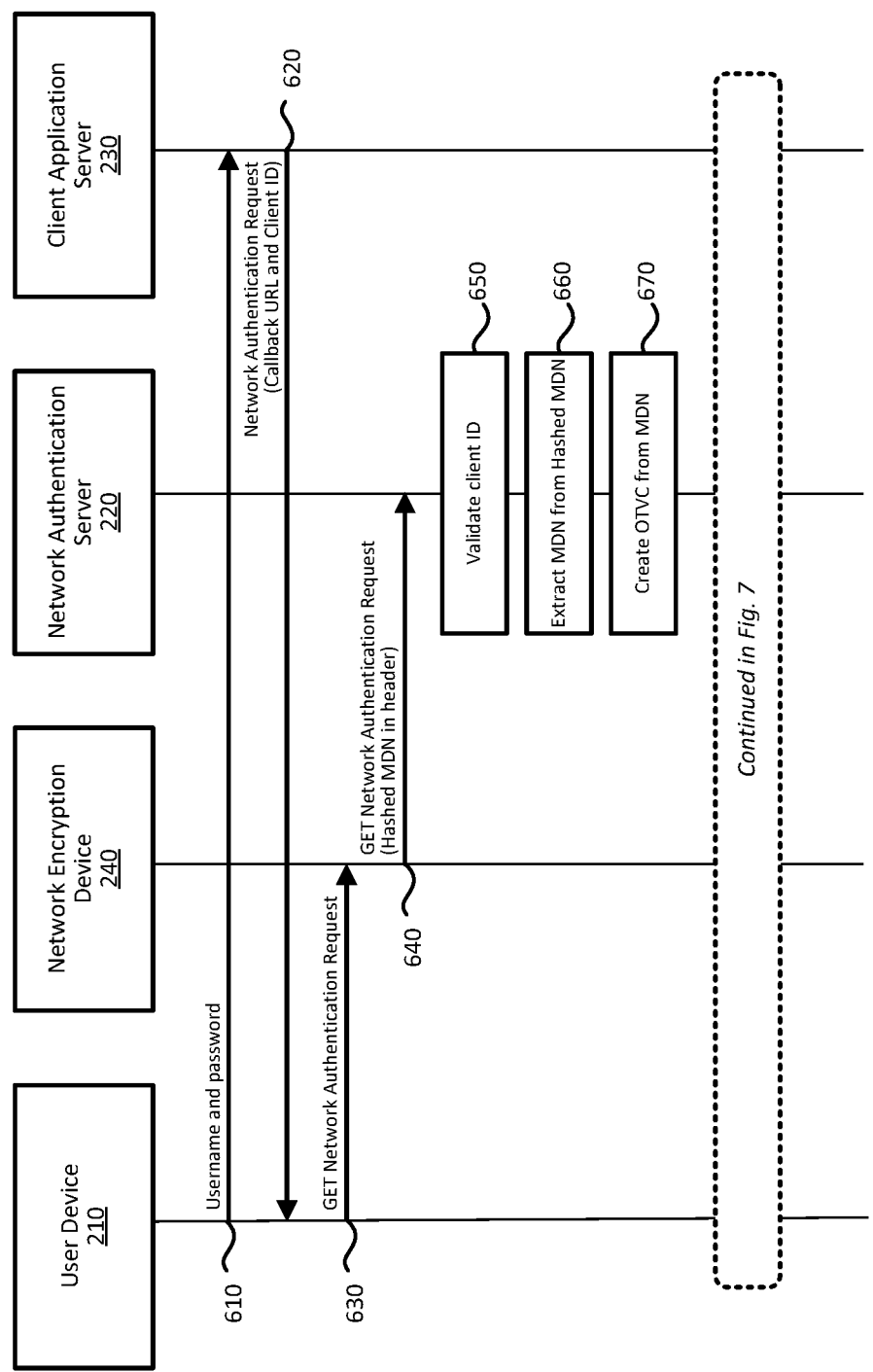
FIGS. 6 and 7 are sequence flow diagrams of an example implementation for providing authentication support services for a two-factor authentication service.
Figure 7:
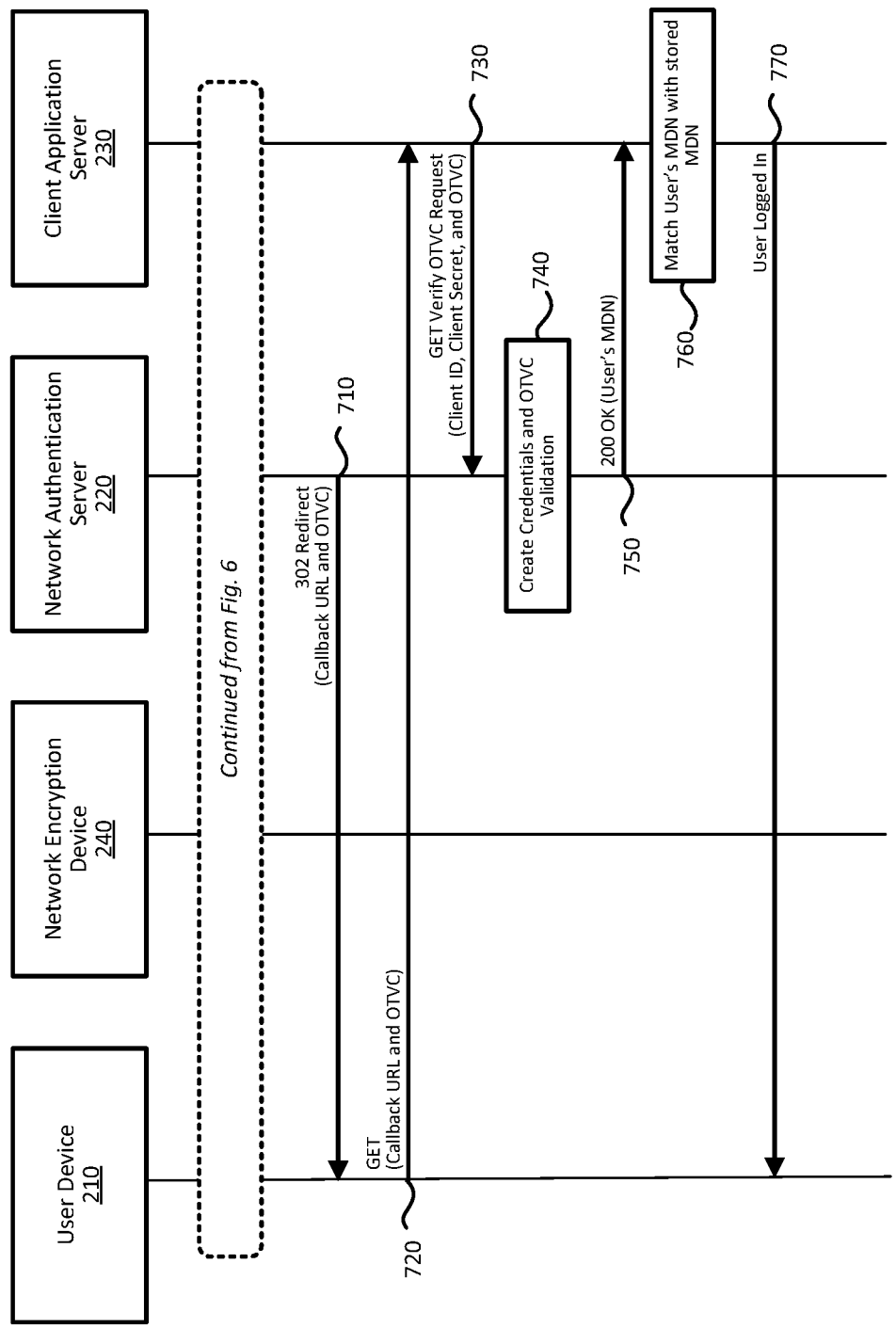

FIGS. 6 and 7 are sequence flow diagrams of an example implementation for providing authentication support services for a two-factor authentication service. As shown, FIG. 6 includes user device 210, network authentication server 220, client application server 230, and network encryption device 240. In some implementation, techniques for providing authentication support services may include additional, fewer, different, or differently arranged devices or operations.

As depicted, user device 210 may communicate user authentication information (e.g., a username and password) in order to login to client application server 230 (line 610). Client application server 230 may verify that the user authentication information is valid and respond by communicating a request to user device 210 to be authenticated by network authentication server 220 (line 620). The request may include a callback URL and client ID of client application server 230. User device 210 may relay the request to network encryption device 240 (line 630).

In some implementations, user device 210 may insert the MDN of user device 210 into the request. Network encryption device 240 may apply a hashing function to encrypt the MDN, insert the encrypted MDN into the header of the request, and forward the request to network authentication server 220 (line 640). As such, the request may include the client ID, the callback URL, and the encrypted MDN. Network authentication server 220 may validate the client ID, decrypt the MDN, and create an OTVC based on the client ID and the MDN (blocks 650, 660, and 670). As shown, the example implementation discussed above with reference to FIG. 6 is continued in FIG. 7.

Referring now to FIG. 7, network authentication server 230 may communicate a message to user device 210 that includes the callback URL of network authentication server 220 (line 710). The message may also include the OTVC. In some implementations, the message may include a HTTP 302 Redirect message. User device 210 may forward the message to client application server 230 (line 720). As mentioned above, the message may include an HTTP Get message, and may include the callback URL and OTVC. Client application serve 230 may respond by communicating a request to verify the identity of user device 210 (line 730). The message may include an HTTP Get message. The message may also include a client ID, a client secret (e.g., a password), and the OTVC.

Network authentication server 220 may validate the client credentials (e.g., client ID and password) of network authentication server 220 and the OTVC (block 740). Upon successful validation of the client credentials and the OTVC, network authentication server 220 may communicate the MDN of user device 210 to client authentication server 230 (line 750). In some implementations, network authentication server 220 may communicate the MDN using an HTTP 200 Ok message. Client application server 230 may validate user device 210 by comparing the newly received MDN with an MDN previously received by client application server 230. In response to a successful authentication of user device 210, client application server 230 may log user device 210 into client application server 230 and send a message to user device 210 regarding the successful login (line 770).

Figure 8:
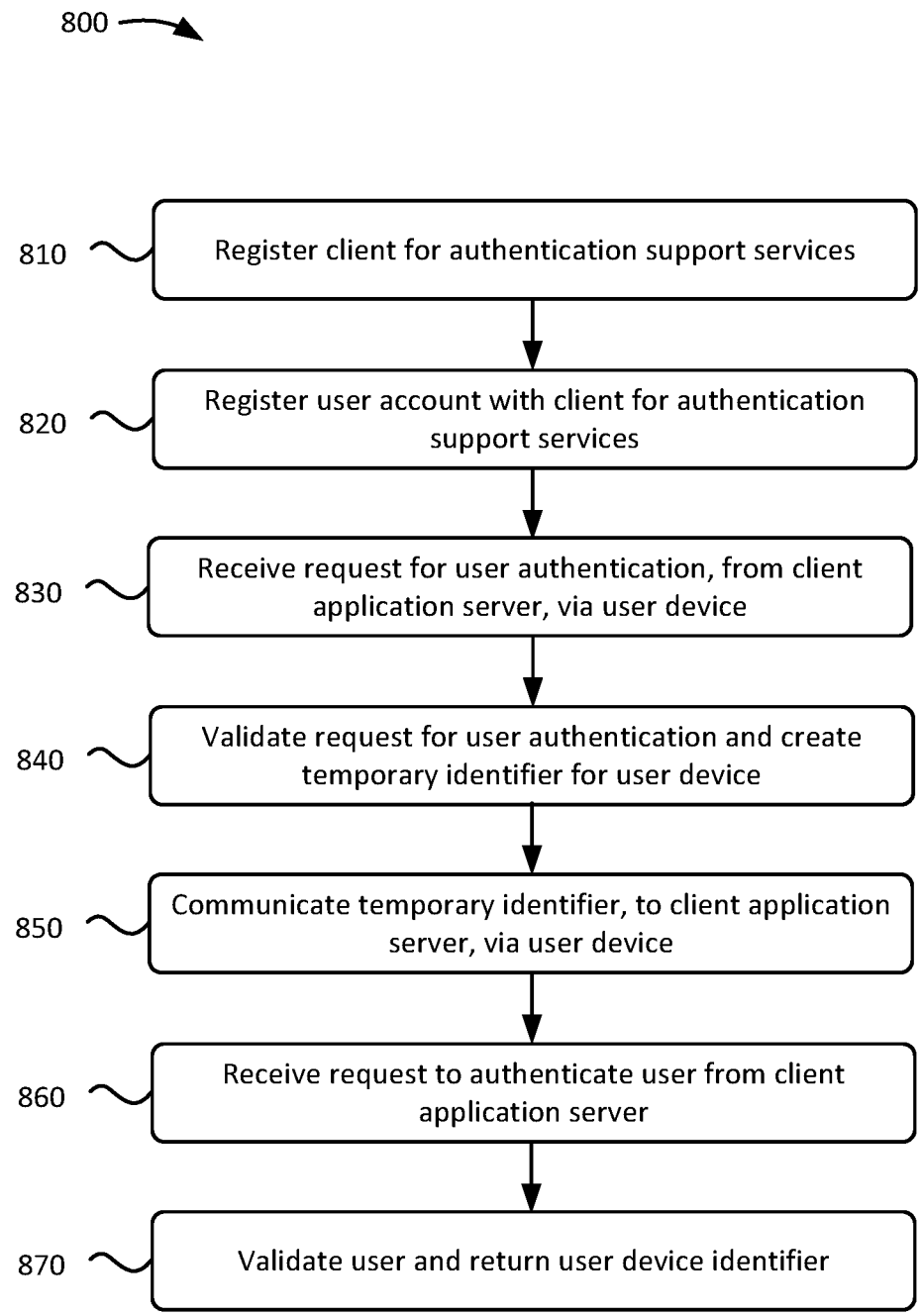
FIG. 8 is a flowchart diagram of an example process for providing authentication support services for a two-factor authentication service.

FIG. 8 is a flowchart diagram of an example process 800 for providing authentication support services for a two-factor authentication service. In some implementations, process 800 may be implemented by network authentication server 220.

As shown, process 800 may include registering client for authentication support services (block 810). For instance, client application server 230 may register with network authentication server 220 for an authentication support service that enables a user to login to client application server 230 with only a username and password (even though the client application server 230 includes a two-factor authentication service). Client application server 230 may provide network authentication server 220 with client credentials (e.g., callback URL and a client ID).

Process 800 may include registering a user's account with client for authentication support services (block 820). For example, network authentication server 220 may receive a notification from client application server 230 that a user of user device 210 would like to register for the authentication support services provided by network authentication server 220.

Process 800 may include receiving a request for user authentication from client application server 230 via user device 210 (block 830). For instance, client application server 230 may send a request to user device 210 for network authentication server 220 to validate user device 210. Additionally, user device 210 may forward the request to network authentication server 220 (which may include the callback URL, client ID, and the MDN of user device 210).

Process 800 may include validating request for user authentication and creating a temporary identifier for user device 210 (block 840). Network authentication server 220 may validate the request based on the client ID and create an OTVC based on the MDN of user device 210. In some implementations, the MDN may be encrypted (e.g., by network encryption platform 240) when received by network authentication server 220, and network authentication server 220 may decrypt the MDN prior to creating the OTVC.

Process 800 may include communicating temporary identifier to client application server 230 via user device 210 (block 850). Network authentication server 220 may send the OTVC to client application server 230 by sending the OTVC to user device 210. Network authentication server 220 may include the callback URL of client application server 230. User device 210 may relay the OTVC to client application server 230 in accordance with the callback URL Process 800 may include receiving request to authenticate user from client application server 230 (block 860). Network authentication server 220 may receive a request, from client application server, to authenticate user device 210. In some implementations, the request may include a copy of the client ID, a client password, and the OTVC.

Process 800 may include validating user and return user device identifier (block 870). Network authentication server 220 may validate the request based on the client ID and password (e.g., client secret). Network authentication server 220 may also validate the user based on the OTVC (e.g., by matching the created OTVC with the received OTVC). In some implementations, network authentication server 220 may return the actual MDN of user device 210 after validating client application server 230 and user device 210. Client application server 230 may validate user device 210 by comparing the received MDN with a stored MDN, and upon a successful validation, notify user device 210 that the user has been logged in.

Figure 9:
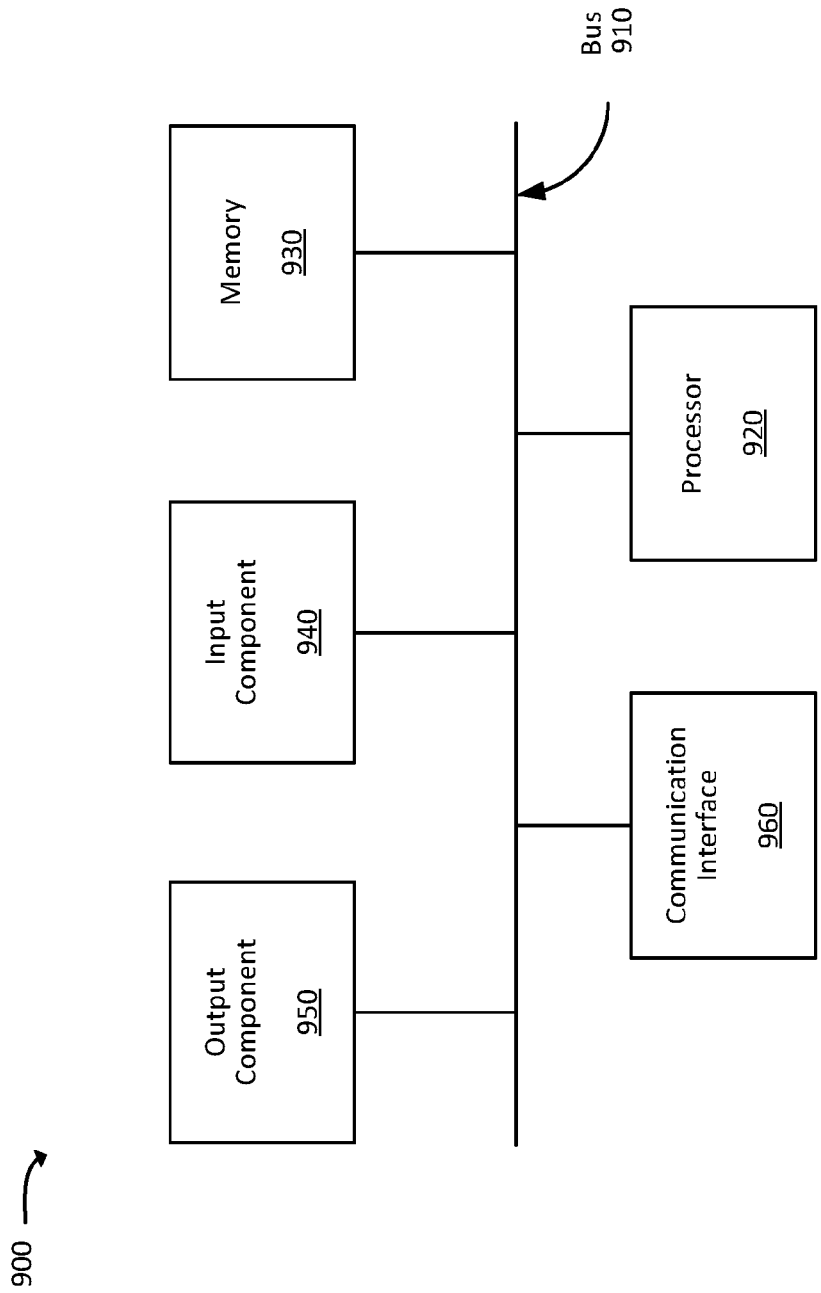
FIG. 9 is a diagram of example components of a device.

FIG. 9 is a diagram of example components of a device 900. Each of the devices illustrated in FIGS. 1A-2 and 4-7 may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like.

Communication interface 960 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of lines, arrows, and/or blocks have been described with regard to FIGS. 1A, 1B, 3-8 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:

receiving, by one or more devices and from a user device, a request, originating from an application server, to authenticate the user device for a service offered by the application server, the request corresponding to a two-factor authentication process implemented by the application server with respect to the user device, the request including an identifier of the application server and an Internet Protocol (IP) address assigned to the user device by a service provider network to which the one or more devices correspond;

determining, by the one or more devices and based on the IP address, a Mobile Device Number (MDN) of the user device as a basis for a second factor of the two-factor authentication process and hashing the MDN to create an encrypted MDN;

extracting, by the one or more devices, the MDN from the encrypted MDN and validating, by the one or more devices, the request to authenticate the user device, the validating being based on the identifier of the application server;

generating, by the one or more devices, a one-time verification code (OTVC) based on the MDN of the user device;

storing, by the one or more devices, correlation information indicating that the OTVC is associated with:
the MDN of the user device, and
the identifier of the application server;

communicating, by the one or more devices, the OTVC to the user device along with instructions for the user device to forward the OTVC to the application server;

receiving, by the one or more devices and from the application server, the OTVC and the identifier of the application server along with a request to validate the OTVC;

validating, by the one or more devices, the request to validate the OTVC, by comparing the identifier of the application server, received in the request to validate the OTVC, with the identifier of the application server, stored as part of the correlation information;
validating, by the one or more devices, the OTVC, included in the request to validate the OTVC, by comparing the OTVC, included in the request to validate the OTVC, with the OTVC, stored as part of the correlation information; and
providing, by the one or more devices, the MDN of the user device, to the application server, as authentication information corresponding to the second factor of the two-factor authentication process implemented by the client application server.

2. The method of claim 1, wherein:
the determining of the MDN of the user device based on the IP address of the user device includes:
accessing a repository of user information that corresponds to subscribers of the service provider network, the user information including:
a plurality of records that associate MDNs of user devices registered with the service provider network with IP addresses assigned, by the service provider network, to the user devices,
identifying a record, of the plurality of records, that includes the IP address of the user device, and
determining the MDN the user device based on the identified record.

3. The method of claim 2, further comprising:
prior to receiving the request to authenticate the user device,
registering the user device to access the service provider network corresponding to the one or more devices;
assigning the IP address to the user device; and
associating the IP address of the user device to the MDN of the user device.

4. The method of claim 1, wherein:
the request to authenticate includes a callback Universal Resource Locator (URL) corresponding to the two-factor authentication process, and
the instruction to forward the OTVC to the application server include the callback URL.

5. The method of claim 1, wherein the request to authenticate the user device includes a redirect message sent from the client application to the user device.

6. The method of claim 1, wherein the instructions to forward the OTVC to the application server include a redirect message.

7. The method of claim 1, wherein:
the request to authenticate the user device includes a password, and
the request to authenticate the user device is validated based on the identifier of the application server and the password.

8. The method of claim 1, further comprising:
prior to receiving the request to authenticate the user device,
registering the user device to access a service provider network corresponding to the one or more devices;
registering the application server for authentication support services offered by the one or more devices; and
registering the user device for the authentication support services, the authentication support services including a service to receive the authentication information, corresponding to the second factor of the two-factor authentication process, from network authentication server.

9. The method of claim 1, wherein:
the one or more devices include a network encryption device and a network authentication server, and
the receiving of the request to authenticate the user device and the determining of the MDN of the user device are performed by the network encryption device,
the method further comprising;
encrypting, by the network encryption device, the MDN of the user device;
inserting, by the network encryption device, the encrypted MDN into a header of the request to authenticate the user device;
forwarding, by the network encryption device, the request to authenticate the user device to the network authentication server;
extracting, by the network authentication server, the encrypted MDN from the header of the request to authenticate the user device; and
decrypting, by the network authentication server, the MDN to proceed with the validating of the request to authenticate the user device.

10. The method of claim 1, further comprising:
receiving, from the application server, an indication of a type of authentication information the second factor of the two-factor authentication process.

11. One or more devices, comprising:
one or more non-transitory memory devices storing a plurality of processor-executable instructions; and
one or more hardware processors configured to execute the processor-executable instructions, wherein executing the processor-executable instructions cause the one or more hardware processors to:
receive, from a user device, a request, originating from an application server, to authenticate the user device for a service offered by the application server, the request corresponding to a two-factor authentication process implemented by the application server with respect to the user device, the request including an identifier of the application server and an Internet Protocol (IP) address assigned to the user device by a service provider network to which the one or more devices correspond;
determine, based on the IP address, a Mobile Device Number (MDN) of the user device as a basis for a second factor of the two-factor authentication process and hashing the MDN to create an encrypted MDN;
extract the MDN from the encrypted MDN and validate the request to authenticate the user device based on the identifier of the application server;
generate a one-time verification code (OTVC) based on the MDN of the user device;
store correlation information indicating that the OTVC is associated with:
the MDN of the user device, and
the identifier of the application server;
communicate the OTVC to the user device along with instructions for the user device to forward the OTVC to the application server;
receive, from the application server, the OTVC and the identifier of the application server along with a request to validate the OTVC;
validate the request to validate the OTVC, by comparing the identifier of the application server, received in the request to validate the OTVC, with the identifier of the application server, stored as part of the correlation information;

validate the OTVC, included in the request to validate the OTVC, by comparing the OTVC, included in the request to validate the OTVC, with the OTVC, stored as part of the correlation information; and provide the MDN of the user device, to the application server, as authentication information corresponding to the second factor of the two-factor authentication process implemented by the client application server.

12. The one or more devices of claim 11, wherein:
to determine the MDN of the user device based on the IP address of the user device, the processor-executable instructions cause the one or more hardware processors to:
    access a repository of user information that corresponds to subscribers of the service provider network, the user information including:
        a plurality of records that associate MDNs of user devices registered with the service provider network with IP addresses assigned, by the service provider network, to the user devices,
    identify a record, of the plurality of records, that includes the IP address of the user device, and
    determine the MDN of the user device based on the identified record.

13. The one or more devices of claim 12, wherein the processor-executable instructions cause the one or more hardware processors to:
    prior to receiving the request to authenticate the user device,
        register the user device to access a service provider network corresponding to the one or more devices,
        assign the IP address to the user device; and
        associate the IP address of the user device to the MDN of the user device.

14. The base station of claim 11, wherein:
    the request to authenticate the user device includes a callback Universal Resource Locator (URL) corresponding to the two-factor authentication process, and
    the instruction to forward the OTVC to the application server include the callback URL.

15. The one or more devices of claim 11, wherein:
    the request to authenticate the user device includes a password, and
    the request to authenticate the user device is validated based on the identifier of the application server and the password.

16. The one or more devices of claim 11, wherein the processor-executable instructions cause the one or more hardware processors to:
    prior to reception of the request to authenticate the user device,
        register the user device to access a service provider network corresponding to the one or more devices;
        register the application server for authentication support services offered by the one or more devices; and
        register the user device for the authentication support services, the authentication support services including a service to receive the authentication information, corresponding to the second factor of the two-factor authentication process, from network authentication server.

17. The one or more devices of claim 11, wherein;
the one or more devices include a network encryption device and a network authentication server, the network encryption device is to receive the request to authenticate the user device and determine the MDN of the user device based on the IP address of the user device, and the processor-executable instructions cause a processor of the network encryption device to:
    encrypt the MDN of the user device;
    insert the encrypted MDN into a header of the request to authenticate the user device;
    forward the request to authenticate the user device to the network authentication server, and the processor-executable instructions cause a processor of the network authentication server to:
    extract the encrypted MDN from the header of the request to authenticate the user device; and
    decrypt the MDN to proceed with the validating of the request to authenticate user device.

18. A server device, comprising:
a non-transitory memory device storing a plurality of processor-executable instructions; and
a hardware processor configured to execute the processor-executable instructions, wherein executing the processor-executable instructions cause the hardware processor to:
    receive a request, from a user device, to access a service provided by the server device, the request including authentication information corresponding to a first factor of a two-factor authentication process implemented by the server device;
    validate the authentication information corresponding to the first factor;
    communicate, to the user device, a request for the user device to:
        use an Internet Protocol (IP) address of the user device to communicate with a network authentication server, and
        obtain, from the network authentication server, a one-time verification code (OTVC) based on a Mobile Device Number (MDN) of the user device without providing the MDN to the network authentication server, the MDN being determined and hashed by a network encryption device to encrypt the MDN and the network authentication server extracting the MDN from the encrypted MDN;
    receive the OTVC, originating from the network authentication server, from the user device;
    communicate the OTVC to the network authentication server along with a request for authentication information corresponding to a second factor of the two-factor authentication process;
    receive, from the network authentication server, the MDN of the user device as the authentication information corresponding to the second factor; and
    completing the two-factor authentication process based on the authentication information corresponding to a second factor.

19. The server device of claim 18, wherein the processor-executable instructions cause the hardware processor to:
    prior to the request to access the service,
        register for an authentication support service provided by the network authentication server;
        register the user device for the service provided by the server device; and
        register the user device for the authentication support service, the authentication support service including a service to receive the authentication information, corresponding to the second factor of the two-factor authentication process, from network authentication server.

20. The server device of claim 19, wherein, to complete the two-factor authentication process, the processor-executable instructions cause the hardware processor to:
compare the MDN received from the network authentication server, to a locally stored copy of the MDN, received by the server device, from the user device, while registering the user device for the service provided by the server device.

* * * * *